Oct. 24, 1939.   G. W. WATTS   2,177,193
DEEP-FAT COOKER
Filed Aug. 11, 1938   3 Sheets-Sheet 2

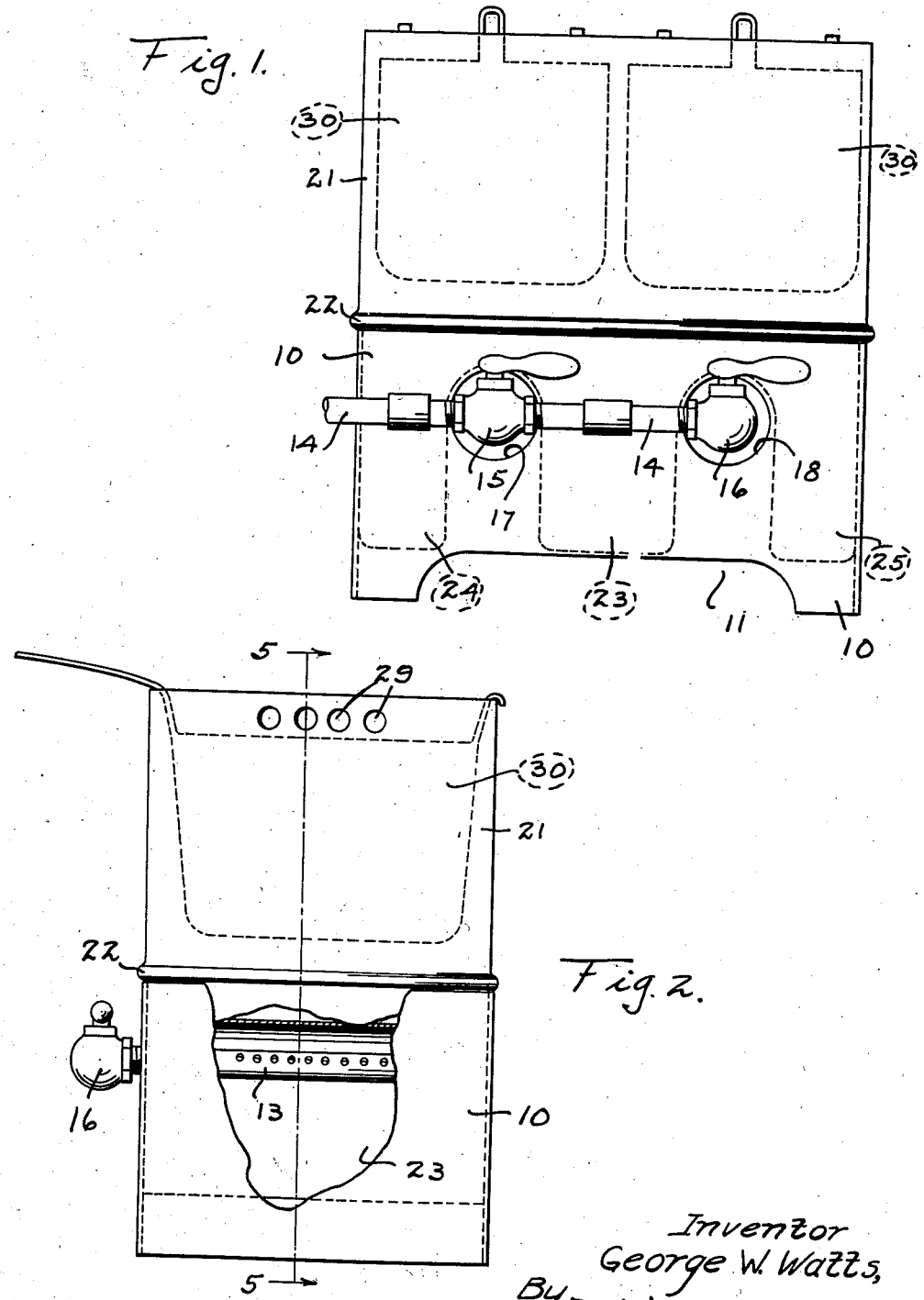

Inventor,
George W. Watts
By Minturn & Minturn,
Attorneys

Patented Oct. 24, 1939

2,177,193

UNITED STATES PATENT OFFICE 2,177,193

DEEP-FAT COOKER

George W. Watts, Indianapolis, Ind.

Application August 11, 1938, Serial No. 224,243

4 Claims. (Cl. 53—7)

This invention relates to deep-fat cookers or fryers and has for a primary object the prevention of the intermixing of crumbs and settlings with the major part of the fat within which the cooking is accomplished.

A further primary object of the invention is to provide an extremely simple structure for the purpose above indicated and one which will have a high degree of safety in preventing the boiling over of fat in the presence of a gas or open flame.

Further objects and advantages of the invention reside in the unique simplicity of the structure as well as the convenience in removing settlings.

These and other objects and advantages of the invention will become apparent to those versed in the art in the following description of one particular form of the invention as illustrated by the accompanying drawings, in which—

Figure 3:
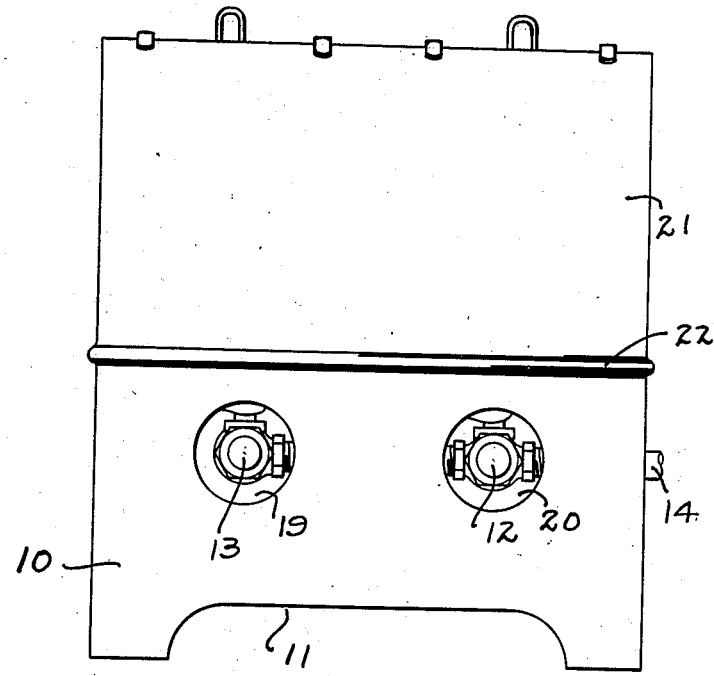
Figure 4:
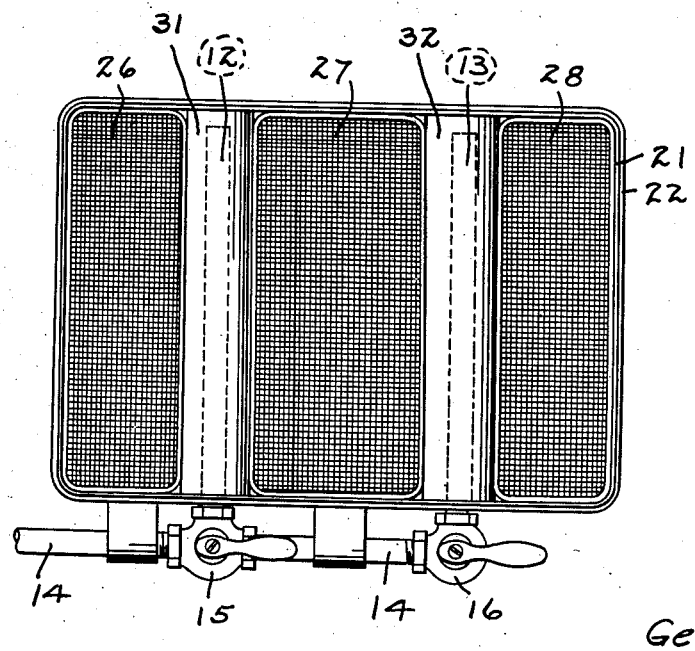

Fig. 1 is a front elevation of a structure embodying the invention;

Fig. 2, an end elevation;

Fig. 3, a rear elevation;

Fig. 4, a top plan view; and

Figure 5:
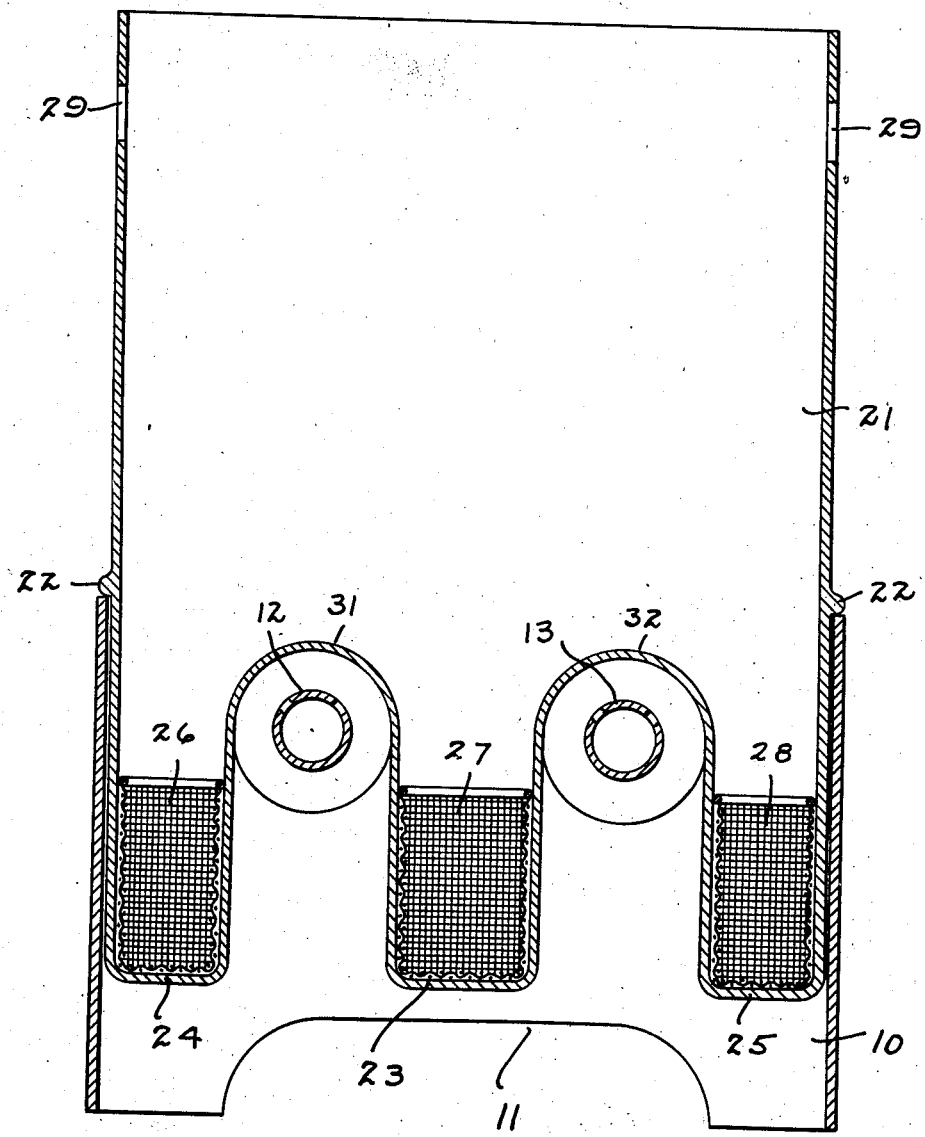

Fig. 5, a vertical section on the line 5—5 in Fig. 2.

Like characters of reference indicate like parts throughout the several views in the drawings.

I form a suitable base 10 herein shown as a simple box-like structure open on the top and bottom sides and preferably made out of metal. As indicated in the drawings, the base 10 is preferably provided with cut away portions 11 on at least two opposite sides, herein shown as being on the front and back sides.

Carried by the base 10 are a desired number of heating elements of any suitable type such as electrical units or gas burners, gas burners being herein shown and being two in number as designated by the numerals 12 and 13. These heating units 12 and 13 are carried to extend across the base 10 from one side to the other, herein shown as from the front to the rear side. With the employment of the gas burners, a suitable gas supply pipe 14 is carried across the front of the base 10 and there supported to have each of the burners 12 and 13 extend from suitable control valves 15 and 16 respectively. In order to provide a sufficient amount of air to support combustion about the burners the base 10 is provided with air admittance holes or windows 17 and 18 on the front side and the rear holes or windows 19 and 20.

A tank 21 is formed out of metal in any suitable manner such as by casting and is so proportioned as to have the base part fit within the base 10 and be supported thereby in any suitable manner such as by a rib 22 extending around the tank 21. The base portion of the tank 21 is formed to have a leg extend down within the base 10 on each side of the respective burners. In the form herein shown, Fig. 5, there is a central leg 23 and the two outer legs 24 and 25. The central leg has a slightly thicker section than the section of either of the legs 24 and 25. The depth of these legs is important in that it should be sufficient to retain the fat or oil in the extreme lower parts thereof sufficiently removed from the burners 12 and 13 as to prevent any undue heating or at least that amount of heating as would normally set up convection currents. These legs extend in a fore and aft manner so that they will straddle the burners when the tank is positioned on its base 10. Preferably each leg carries the baskets 26, 27 and 28, respectively, which are made of a fine mesh wire so as to retain the crumbs or sediment dropping into the legs from the materials being cooked in the mass of fat thereabove. By simply lifting out the respective basket, this sedimentary matter is carried out of the fat without being mixed therewith.

Moreover the main mass of fat is heated by the burners 12 and 13 without in any material way affecting the temperature of the fat remaining in the respective legs below the burners. This differential in temperature also aids in the quick precipitation of the crumbs and this is an important factor in maintaining the fat in a good, usable condition free of odors, taste, and particularly helping to prevent the fat from becoming rancid.

The tank 21 is provided with a plurality of holes 29 on each side. These holes have two important functions. One function is to provide openings to permit the fingers of the operator to grip the tank 21 when it is to be removed from its base. The other function is to provide overflow means at a level lower than the front and back edges so that, in the event the fat is overheated, or some moisture gets into the fat, the overflowing oil will go out the sides of the tank and run down over the base and thus be kept away from the burners 12 and 13. An overflow on either the front or back sides of the tank would permit the fat to be ignited from the heat escaping from the ends of the openings 17, 18 or 19, 20.

The upper part of the tank 21 is left clear so that the usual baskets 30 may be immersed therein for cooking materials as desired.

As indicated by the drawings, the heating elements 12 and 13 are positioned to be in the upper parts of the tunnels between the respective legs and in this manner, there is the greatest possible utilization of heat from those elements since there is an increased radiation surface obtained by reason of the crowned parts 31 and 32 which form the bottom of the tank 21 between the respective legs.

While I have herein shown and described my invention in the one particular form, it is entirely obvious that structural changes such as different types of heating elements, different forms of bases, and the like, may be employed without departing from the spirit of the invention, and I, therefore, do not desire to be limited to that precise form beyond the limitations as may be imposed by the following claims.

I claim:

1. In a deep-fat cooker, a fat containing tank, a plurality of legs extending from the tank to form a tunnel between adjacent legs, and a heating element in each tunnel, each of said legs having its lower end spaced and disconnected as to fat conductors from an adjacent leg and of sufficient depth as to prevent any appreciable heating of fat in the lower ends, whereby said ends are substantially free from currents in the fat and thereby afford settling basins, a base supporting said tank, and means on the base supporting said heating element, whereby said tank may be lifted from the base independently of said element, said base having vents on opposite sides, and said tank having overflow means on its sides presented on closed sides of the base.

2. In a deep-fat cooker, a fat containing tank, a plurality of legs extending from the tank to form a tunnel between adjacent legs, and a heating element in each tunnel, each of said legs having its lower end spaced and disconnected as to fat conductors from an adjacent leg and of sufficient depth as to prevent any appreciable heating of fat in the lower ends, whereby said ends are substantially free from currents in the fat and thereby afford settling basins, a base supporting said tank, and means on the base supporting said heating element, whereby said tank may be lifted from the base independently of said element, and foraminated baskets closely fitted in said legs.

3. In a deep-fat cooker, a fat container tank, a plurality of legs extending downwardly from the tank to form a tunnel between each pair of adjacent legs, each leg consisting of an independent chamber opening only by its top side into said tank, heating means in the tunnels, a base into which said tank telescopes at least far enough to carry said legs into the base, and said base having walls extending across the ends of said tunnels.

4. In a deep-fat cooker, a fat container tank, a plurality of legs extending downwardly from the tank to form a tunnel between each pair of adjacent legs, each leg consisting of an independent chamber opening only by its top side into said tank, heating means in the tunnels, a base into which said tank telescopes at least far enough to carry said legs into the base, and said base having walls extending across the ends of said tunnels, and windows at the upper portions of the tunnels, and said base further having openings in its wall at the bottom of the tunnels.

GEORGE W. WATTS.